US009176820B2

(12) United States Patent
Simha et al.

(10) Patent No.: US 9,176,820 B2
(45) Date of Patent: Nov. 3, 2015

(54) DISK LOGGING METHOD APPLICABLE TO STORAGE MEDIUM AND ELECTRONIC DEVICE, STORAGE MEDIUM USING THE SAME AND ELECTRONIC DEVICE USING THE SAME

(71) Applicant: Industrial Technology Research Institute, Hsinchu (TW)

(72) Inventors: Dilip Nijagal Simha, Hsinchu (TW); Tzi-Cker Chiueh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 217 days.

(21) Appl. No.: 14/080,813

(22) Filed: Nov. 15, 2013

(65) Prior Publication Data

US 2014/0289456 A1 Sep. 25, 2014

Related U.S. Application Data

(60) Provisional application No. 61/803,120, filed on Mar. 19, 2013.

(51) Int. Cl.
*G06F 12/00* (2006.01)
*G06F 11/14* (2006.01)
*G06F 12/02* (2006.01)
*G06F 12/08* (2006.01)
*G06F 3/06* (2006.01)

(52) U.S. Cl.
CPC ........ *G06F 11/14* (2013.01); *G06F 3/06* (2013.01); *G06F 12/0238* (2013.01); *G06F 12/0866* (2013.01); *G06F 12/0868* (2013.01); *G06F 12/0871* (2013.01); *G06F 12/0873* (2013.01)

(58) Field of Classification Search
CPC ............ G06F 12/0238; G06F 12/0246; G06F 12/0866; G06F 12/0868; G06F 12/0871; G06F 12/0873
See application file for complete search history.

(56) References Cited

U.S. PATENT DOCUMENTS

| 5,557,770 | A | 9/1996 | Bhide et al. |
|---|---|---|---|
| 6,922,752 | B2 | 7/2005 | Uysal et al. |
| 7,409,494 | B2 | 8/2008 | Edwards et al. |
| 7,882,304 | B2 | 2/2011 | English et al. |
| 7,996,645 | B2 | 8/2011 | New et al. |
| 2005/0243609 | A1* | 11/2005 | Yang et al. ............... 365/189.05 |

OTHER PUBLICATIONS

Shimin Chen, "Flashlogging: Exploiting Flash Devices for Synchronous Logging Performance," Proceedings of the 2009 ACM SIGMOD International Conference on Management of data, Jun. 29, 2009, pp. 73-86.

Freitas, R.F., et al., "Storage-class memory: The next storage system technology," IBM Journal of Research and Development, vol. 52, Jul. 2008, pp. 439-447.

John A. Chandy, "A Dual Actuator Logging Disk Architecture," 2007, Available at: http://citeseerx.ist.psu.edu/viewdoc/download-?doi=10.1.1.75.1419&rep=rep1&type=pdf.

Peter M. Chen, "Optimizing Delay in Delayed-Write File Systems," 1996, Available at: http://citeseerx.ist.psu.edu/viewdoc/summary?doi=10.1.1.74.4487.

* cited by examiner

*Primary Examiner* — Shawn X Gu
(74) *Attorney, Agent, or Firm* — Jianq Chyun IP Office

(57) ABSTRACT

The present disclosure proposes a disk logging method configured for an electronic device comprising a temporary nonvolatile storage medium to log data from a volatile memory to said first storage medium, and the method includes the elements of aggregating data from applications of the electronic device in a queue, transferring the aggregated data to a per device queue targeted toward a native queue of the storage medium, writing the data stored in the native queue of the storage medium into a disk platter of the storage medium, and transmitting an interrupt in response to the completion of the writing of the data to the disk platter, wherein the first batch size is dynamically adjusted such that the step of writing the data to the platter takes more time than the step of transferring the data from the per device queue to the native queue of the storage medium.

44 Claims, 14 Drawing Sheets

| File/RAW | Threads | Latency | Throughput |
|----------|---------|---------|------------|
| File | 1 | 14.149 | 25.3 |
| File | 8 | 14.125 | 25.3 |
| RAW | 1 | 8.308 | 119.8 |
| RAW | 8 | 8.312 | 119.8 |

| CYCLE | STAGE 1 ACCUMULATE | STAGE 2 ACCUMULATE | STAGE 3 ACCUMULATE | STAGE 4 ACCUMULATE |
|---|---|---|---|---|
| 1 | R4 | R3 | R2 | R1 |
| 2 | R5 | R4 | R3 | R2 |
| 3 | R6 | R5 | R4 | R3 |

FIG. 4B

| Starting Offset (GB) | Optimal Batch Size (Bytes) | Latency (u sec) | Throughput (OPs/sec) |
|---|---|---|---|
| 900 | 24 | 1183 | 241158 |
| 750 | 24 | 981 | 290390 |
| 500 | 28 | 932 | 356791 |
| 0 | 32 | 938 | 404228 |

| Disks | Latency (u sec) | Throughput (Ops/sec) |
|---|---|---|
| 1 | 938 | 404228 |
| 2 | 934 | 810250 |
| 3 | 950 | 1192554 |

FIG. 11C

| Log Size (Bytes) | Latency (u sec) | Throughput (Ops/sec) |
|---|---|---|
| 512 | 959 | 193275 |
| 256 | 938 | 404228 |
| 128 | 986 | 849461 |
| 64 | 1011 | 1639408 |

FIG. 11D

DISK LOGGING METHOD APPLICABLE TO STORAGE MEDIUM AND ELECTRONIC DEVICE, STORAGE MEDIUM USING THE SAME AND ELECTRONIC DEVICE USING THE SAME

CROSS REFERENCE TO RELATED APPLICATION

This application claims the priority benefit of U.S.A. provisional application Ser. No. 61/803,120, filed on Mar. 19, 2013. The entirety of the above-mentioned patent application is hereby incorporated by reference herein and made a part of specification.

TECHNICAL FIELD

The present disclosure relates to a disk logging method configured for a temporary non-volatile storage medium to log data from a volatile memory to said storage medium, and the same method is configured for an electronic device having said storage medium. The present disclosure also relates to a non-transitory storage medium using the disk logging method and an electronic device using the disk logging method.

BACKGROUND

A computer application would typically be store data in a random access memory (RAM) for quick access as RAM is much faster than a non volatile disk. However, if a system which hosts the computer application crashes, the contents stored in the RAM cannot be recovered as RAM is a volatile form of memory. For many applications, such as writing intensive applications, logging data stored in RAM to a form of temporary but persistent memory or a logging disk has been utilized so that if a system crash were to occur, a recover process would be performed to restore data from the logging disk to the volatile memory. The data logged to the logging disk would then be transferred to the system's normal disk drive for permanent storage.

However, there has not been a universal consensus for the best type of persistent memory used for logging disk. A flash based memory such as Non-Volatile RAM (NVRAM) would be considered expensive at this point in time while a hard disk drive (HDD) as been generally dismissed as being slow and unsuitable to be used as a logging disk. Phase Changing Memory (PCM) could be a faster alternative to a flash based memory but could not easily be adopted as a logging disk in the near future because of the small density and high cost of the PCM. Optimizing the latency and throughput of the disk logging process has also not been a trivial task.

Throughput could be defined as the total number of logging operations, including readings and writings, completed by a logging disk. Latency could be defined as the time between when a logging request is received by a queue of a logging disk and when the logging request is successfully written to the logging disk platter and ready to be acknowledged to user application. Latency and throughput would be two of the parameters which a logging system would optimize as an ideal disk logging system would have low latency and high throughput. A perceived response time of a logging request to a logging system would be dominated by the latency of a logging operation and its associated operations.

Providing high throughput and low latency for logging operations with small payloads such as 64 bytes or 128 bytes are critical as many applications only need to log the information associated with high-level operations, such as an update to a record in a B-tree page or a hash table bucket. The size of the information is typically small. Low logging latency is crucial because it directly impacts the user-perceived response time, and because many applications would be bound to the latency of the logging disk since more requests cannot be processed unless previously submitted requests have been completed.

However, it turns out that achieving both high throughput and low latency for logging operations, especially for fine-grained operations, is not at all trivial. Three key challenges have been identified. First, there is a mismatch between fine-grained logging and modern file systems. More concretely, the file systems use 4 KB blocks as the basic units of reading and writing, and hence logging a 64-byte or 128-byte record to a log file may require a read of the log file's last block as well as a write of the same block after appending the log record to it. Second, there are multiple processing steps on the data path between the system call interface to the disk platter that a logging operation's payload needs to traverse, and some of these steps may incur a per-operation overhead. Therefore that consecutive logging operation requests be properly merged so as to effectively amortize these per-operation overheads and still rein in the average logging latency. Third, to improve the raw data transfer capability of modern disks, it would be a way to transform high-level logging operation requests to low-level disk access requests for small data sizes in such a way that would prevent the logging disks from sitting idle most of the time.

Given these problems, existing techniques may not be fully address all of these challenges. For instance, delayed writing involving logging followed by an asynchronous write would shift the bottleneck to the logging operation. If the logging record size were assumed to be small, the underlying storage has to manage high throughput with low latency in cases of small random logging updates. Also many optimizing techniques would involve having accurate control over disk geometry details like rotational latency, seek latency, number of sectors in each track, zone coding, bad sectors mapping and other finer details. At this point in time, it would seek a way to implement ideas requiring these details because of the advanced disk compaction techniques and some disk manufacturers no longer supply the inner details of disk layouts because of complicated disk management techniques and competitive market. Also it should be mentioned that disk head prediction techniques could not easily be adopted since it could be difficult with modern disk drives.

Another approach involve maintaining a map of used and free blocks on disk in order to place the incoming data accurately on an unoccupied block and at the same time avoid track switch delay; However, maintaining mapping information would render the logging scheme unnecessarily complex and may require estimation of the geometry of the disk.

Also having a logging disk array using Redundant Array of Independent Disks (RAID) technology to handle small writes problem and NVRAM buffer to provide persistency to the cache has been proposed. However, latency in writing to NVRAM buffer is very low (in order of microseconds), and flushing NVRAM buffer to disk is not a trivial task. Though optimal size is chosen in units of stripe size, there are various other factors which determine whether the disk is utilized to the best extent. Another important factor to note is that NVRAM is a costly hardware resource as already been mentioned. In many situations, writing to NVRAM can yield very slow response times.

Another alternative could be to developed to handle small buffer size writes. The entire file system is organized as a sequential log which converts writes from user application and appends to the underlying log structure in the File System. But logging operations require persistent write to disk and hence synchronous writes are required and would obviously yields a very low performance on a naive log structured file system (LFS). Although modified techniques use NVRAM or flash to make LFS handle synchronous writes efficiently, both NVRAM and Flash are costly hardware alternatives. Though flash based disks provide high throughput and low latency, erase cycles are slow and hence the performance of the flash disk goes down when its utilization factor goes up. Also, the basic block size of flash ranges from kilobytes to megabytes and is much higher than the sector size of typical magnetic hard disks. The erase operation in flash devices requires the block size to be of bigger size to get optimal results. However having a bigger block size increases the latency of smaller requests which need to be aggregated to form a bigger block size.

Based on the aforementioned reasons, an alternative to disk logging would be proposed.

SUMMARY OF THE DISCLOSURE

The present disclosure proposes a disk logging method configured for a temporary non-volatile storage medium to log data from a volatile memory to said storage medium, and the same method is configured for an electronic device having said storage medium.

Accordingly, The present disclosure proposes a disk logging method configured for a temporary non-volatile storage medium to log data from a volatile memory to said storage medium, and the method includes the elements of receiving a first data having a first batch size from an external source and storing the first data to an queue of the storage medium, writing the first data to a disk platter of the storage medium, and transmitting an interrupt in response to the completion of the writing the first data to the external source, wherein the first batch size is dynamically adjusted such that the step of writing the first data takes more time than the step of receiving and storing the first data.

The present disclosure proposes a disk logging method configured for an electronic device containing elements which includes at least but not limited to a first temporary non-volatile storage medium to log data from a volatile memory to said first storage medium, and the method includes the elements of aggregating a first data from applications of the electronic device in a first queue, transferring the first data of the first queue to a second queue of the first storage medium, wherein the second queue is exclusively for the first storage medium and a second data with a first batch size is generated from the first data, transferring the second data to a third queue which is native to the first storage medium, writing the second data to a disk platter of the first storage medium, and transmitting an interrupt in response to the completion of the writing the second data to the first queue, wherein the first batch size is dynamically adjusted such that the step of writing the second data takes more time than the step of transferring the second data to the third queue.

The present disclosure proposes a non-transitory storage medium comprising a controller, wherein the controller is configured for receiving a first data having a first batch size from an external source and storing the first data to an queue of the storage medium; writing the first data to a disk platter of the storage medium; and transmitting an interrupt in response to the completion of the writing the first data to the external source, wherein the first batch size is dynamically adjusted such that the step of writing the first data takes more time than or substantially the same time as the step of receiving and storing the first data.

The present disclosure proposes an electronic device for disk logging comprising a first temporary non-volatile storage medium to log data from a volatile memory to said first storage medium, and the subsystem comprises a controller configured for: aggregating a first data from applications of the electronic device in a first queue; transferring the first data of the first queue to a second queue of the first storage medium, wherein the second queue is exclusively for the first storage medium and a second data with a first batch size is generated from the first data; transferring the second data to a third queue which is native to the first storage medium; writing the second data to a disk platter of the first storage medium; and transmitting an interrupt in response to the completion of the writing the second data to the first queue, wherein the first batch size is dynamically adjusted such that the step of writing the second data takes more time than the step of transferring the second data to the third queue.

In order to make the aforementioned features and advantages of the present disclosure comprehensible, some embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 4B illustrates a four stage disk write pipeline in accordance with one of the exemplary embodiments of the present disclosure.

FIG. 11A~11D illustrates the performance measurement of the method of the present disclosure.

DETAILED DESCRIPTION OF DISCLOSED EMBODIMENTS

Figures 1, 2:
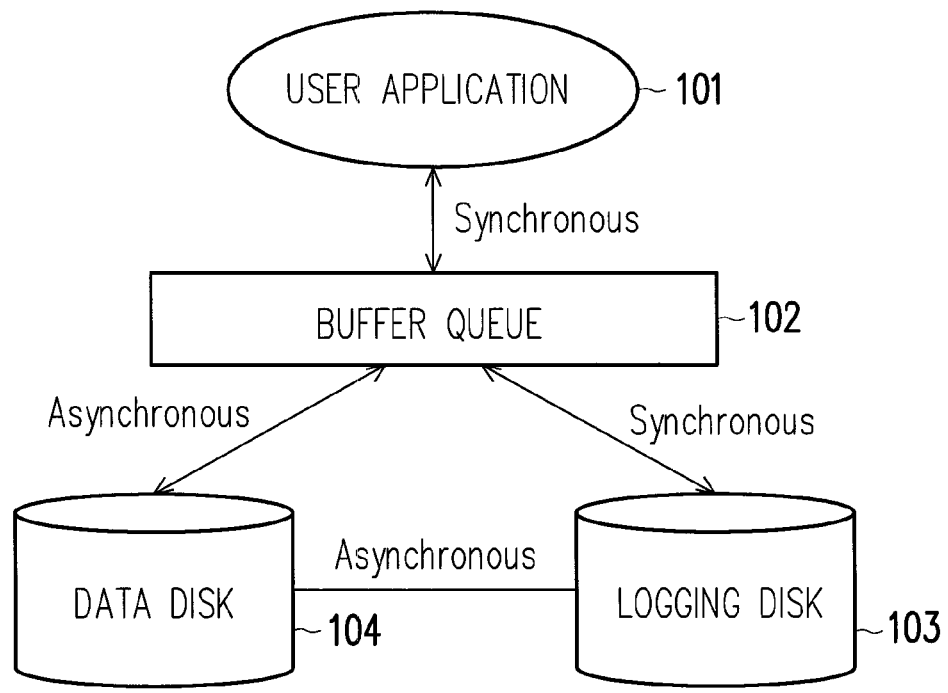
FIG. 1 illustrates the concept of disking logging in accordance with the present disclosure.
FIG. 2 is a table which illustrates latency and throughput of file based and raw disk logging using 512 bytes as the logging operation request size.

Reference will now be made in detail to the present embodiments of the disclosure, examples of which are illustrated in the accompanying drawings. Wherever possible, the same reference numbers are used in the drawings and the description to refer to the same or like parts.

In view of the aforementioned challenges, a disk logging system architecture featuring a floating logging operation API that allows an application to perform a logging operation without specifying the target address of the operation's payload has been proposed. The disk logging system streamlines disk write pipeline which aims to aggregate logging operation requests optimally and subsequently move aggregated operations through the pipeline in such a way that makes use of the raw data transfer capability of a hard disk.

Therefore, present disclose proposes using a traditional hard disk drive which is generally referred as 'HDD'. HDD could be a SATA disk or a SAS disk or a SCSI disk as long as they all contain a platters and divided into sectors and tracks. In other words, the present disclosure proposes taking advantages of certain attributes of a HDD and using a HDD as the logging disk. Although HDD has been considered by some to be unsuitable for logging disks, preliminary measurements on a fully operational set of three disks have shown that 1.2 million 256 byte logging operations per second with each logging operation's latency kept below 1 msec could be accomplished. Moreover, even when logging operation requests arrive sparsely, the present disclosure is still able to achieve sub-msec logging operation latency. Although solid-state disk (SSD) could be a promising technology for disk-intensive workloads, it may not out necessarily be a better fit than hard disks (HDD) for logging operations since mainstream SSDs use multi-level cells, the per-cell write count limit would be reduced to 10000, which may not fare well with the write-intensive nature of logging operations. Also, HDDs would command a significant per-byte cost advantage over SSDs and would be more feasible to trade space for performance by giving abundant space to each log device so as to reduce the garbage collection overhead to the minimum. Furthermore, for a HDD, there is no limitation on the number of writes per sector, unlike a SSD.

The present disclosure would be designed as a building block for constructing high-level logging and recovery subsystems and would provide a cyclic persistent log device which is large enough (tens of gigabytes) that FIFO-based garbage collection would work adequately. That is, by the time the logging process reaches the end of an application's log device or the end of the logging disk, log records in the beginning of the log device would no longer be needed, and thus the disk would be wrapped around in order to be logged from the beginning. Data which have been written to a log disk would also be written to a permanent storage disk but in a delayed manner. Once the data is written to a permanent disk, the data would no longer needed on log disk. By making sure that a log disk is sufficiently large, the logged data would also be put on the permanent disk by the time the log disk has been written in all of its positions. Typically for a 1 Terabyte (TB) logging disk, writing in all of its positions on the logging disk would take around 3-4 hours assuming that the disk is spun at 7200 RPM. And therefore, a subsequent asynchronous write from a logging disk to a permanent storage would typically occur in less than a few minutes after a data is logged, and hence a HDD could be reused as a temporarily persistent storage.

In should be noted that the logging device of the present disclosure may not need to do garbage collection by the time data is written to the last sector on last track as the data on first sector on first track is assumed to be committed to the data disk. The assumption would be valid for a large range of applications which maintain an in-memory buffer and commits the data to data disk within 3 hours. On a 1 TB disk for example, it may take as long as 3 to 4 hours to make a complete sweep of the logging disk. But for applications which maintain large in-memory buffer, the time taken to commit the data in in-memory buffer to data disk could be longer than 3-4 hours. Hence a logging device may not afford to erase some portions of a logging disk. Therefore, in another exemplary embodiment, an archival disk for that purpose would be proposed. This means that whenever the disk head reaches to the end of the log disk, instead of wrapping around to the first sector, first track on that log disk, a fresh new log disk would be chosen for logging data. The completely written log disk is then backed up to an archival storage and that log disk is then made available for future logging operations. Depending on the size of the in-memory buffer and the time taken by the application to commit data to data disk, the logging data in archival storage would be kept intact.

In terms of functionalities, at run time, the logging system synchronously writes the payload of each logging operation to a logging disk, and at recovery time, the logging system recovers data from the active portion of the logging disk and returns the data to the application. Also the present disclosure would not need to interpret the payloads of retrieved log records because the size and structure of each application-specific log record would be completely opaque to the logging system. Instead, the application's recovery subsystem would perform such interpretation on the log records returned by the logging system. The higher level application would need to determine what information to log such as metadata updates or checkpoint summary and then utilizes the logging system to log the information to disk.

FIG. 1 illustrates the concept of disking logging in accordance with the present disclosure. A user application 101 may generate data to be stored in a temporarily buffer queue 102, which could be Cache memory or RAM. The buffer queue 102 would be volatile memory and would be erased when the host system crashes or is unplugged. The embodiment of a logging system 100 would use a logging disk 103 to provide persistent storage for data stored in the buffer queue 102 in a way such that any data present in the buffer queue 102 would be logged or synchronously copied to the logging disk 103. As soon as data in the buffer queue 102 is logged in the logging disk 103, the logged data would be transferred to the data disk 104 for permanent storage as a background process. The logging disk 103 as previously mentioned would be a HDD disk.

FIG. 2 is a table which illustrates latency and throughput of file based and raw disk logging using 512 bytes as the logging operation request size. The numbers in FIG. 2 was obtained by appending a payload to a log file, and the payload was generated by a user level Linux application having the payload size equals to 512 bytes. Based on the numbers of FIG. 2, it could be observed that a file system would worsen the latency and throughput of the logging operation. The reasons would be related to latency penalty due to extra data copying, and also a file write system call could trigger multiple disk I/Os because of accesses to the file system metadata. Bi-passing the file system altogether using device based disk logging or raw disk logging would increase the throughput and decrease the latency. Therefore, it should be noted that the present disclosure does not require a file system.

It could be observed that having 8 threads would not increase the overall system performance, and also without optimization, the average logging latency would still be quite high. The source of the high latency would be the result of consecutive logging operations which were issued synchronously. More concretely, the N+1 th logging operation is issued only after the N-th logging operation is completed. This means that by the time the disk I/O for the N+1 th logging operation reaches the disk, it misses the its target sector and needs to wait for a full rotation, which is roughly 8.3 msec for a 7200 RPM disk drive.

One of the objectives of the present disclosure is to translate the raw data transfer bandwidth of modern HDDs into a high throughput and low latency for logging operations. Therefore, toward this goal, a toy train disk logging operations would be proposed. The toy train technique would constantly submit new disk write requests with consecutive target disk addresses to the logging disk so as to keep the disk fully occupied even in the absence of application level logging operation requests. This proposed toy train model enable the disk I/O software to have a tight grip of the disk head position without requiring detailed knowledge of the internal structures and geometry of the disk. The disk write pipeline is analogous to a toy train moving constantly around a closed circuit with two stations with cargo loaded into the train in one station and cargo offloading the train in the other station. Even when there is no cargo on board, the train would still be running around the circuit at full speed and never stops assuming that train could load and unload cargos on the fly without slowing down. The constant wear and tear of the disk would be a non-issue since for a 2 TB disk, for example, would be completely overwritten only 5 times per day, and it would take 5 years to overwrite the disk 10,000 times.

Figure 3:
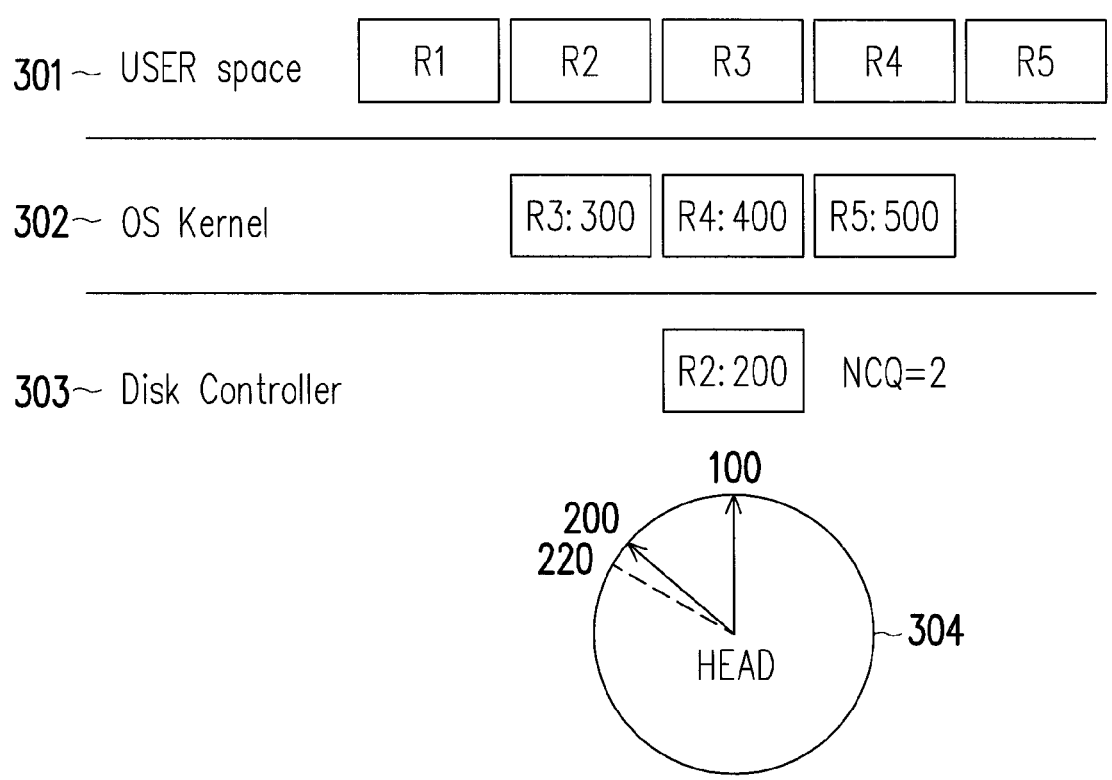
FIG. 3 illustrates a toy train technique with consecutive disk writes in accordance with one of the exemplary embodiments of the present disclosure.

FIG. 3 illustrates a toy train technique with consecutive disk writes in accordance with one of the exemplary embodiments of the present disclosure. Assuming that the user space 301 in the application level has generated five logging requests labeled R1~R5 to be transferred synchronously to the OS kernel 302, which would subsequently aggregate and queue the logging requests (e.g. R3~R5). The disk controller 303 would then control the writing operation of the writing requests on the disk platter 304. It is noted that the writing of the data from the logging requests would be constant, and this means that when a first data is written onto the disk platter 304 in location 100, the next data must be ready to be written in location 200. If assuming that next data would not be ready to be written in 200 but in 220, the disk controller would lose the timing of the write operation and consequently lose the control of the logging operation.

A conventional disk write request requires the disk head to traverse to the exact user requests location on disk, and by doing such would incur several types of latencies including seek latency, rotation latency, and queuing latency. To avoid these latencies, the write operation would need to be in exactly where the disk head supposes to be by using accurate disk geometry details, but predicting the exact disk geometry details would be very difficult as current market vendor no longer publish the necessary details. Therefore, the present disclosure proposes that the data from user requests are written on the disk platter 304 continuously such that the disk head would not have to switch tracks and would not incur unnecessary latencies.

For the example of FIG. 3, the proper operation in accordance with the present disclosure would write data one after the other. This would mean that when R1 is written in location 100, R2 must be ready to be written in location 200 while R3~R5 would be waiting in a queue to be transferred to an onboard queue of the logging disk.

Hence, efficient conversions would be the result of feeding the disk with write requests with consecutive start addresses in such a way that the on-disk controller 303 constantly puts data onto the disk platters 304 nonstop. Disk drives that support command queuing could service one request after another without gaps between them. Most modern SATA drives come with an efficient command queuing implementation called Native Command Queuing (NCQ) which would provide optimization mechanisms including queuing disk access commands in the disk drive to enable the on-disk controller 303 to immediately service the next command in the queue when the previous command is completed, batching and/or scheduling queued commands to reduce the number of commands that need to be serviced and the disk access overhead, and supporting interrupt coalescing which aggregates multiple completion interrupts and signals the host once for them to reduce the total interrupt processing overhead. Also by setting the NCQ queue length to 2, the on-disk controller 303 would not be able to choose which writing requests to write on the disk platter 304 except the one lined up in the on-disk queue. If there were no data generated by the user space 201 at all after request R1 is written in location 100, the disk controller would coordinate a dummy data to be written in location 200.

For example, writing continuous data would mean that if data of R1 at location 100 is 32 kilobytes (KB), data of R2 at location 200 would also be 32 (KB) with no empty space in between 100 and 200. If there is no data ready to be written, the on-disk controller 303 would insert a dummy data at 200, and the size of the dummy data would be 32 kB. Therefore, unlike existing techniques, the method of the present disclosure would not need to know the exact disk geometry details like sectors per track, zone boundaries, RPM, angular speed, etc. The method of the present disclosure would feed the logging disk with write requests with consecutive start addresses such that the on-disk controller would constantly put data onto the disk platters nonstop and hence the write pipeline would be accurately positioned to predict the disk head movement to finer accuracy.

One of the optimization goals of the present disclosure would be to convert as much as possible a disk's raw data transfer rate into a proportionally high I/O rate, such as turning a byte rate of 100 Mbytes/sec into an I/O rate of 100000 1

KB-writes per second. The present disclosure proposes that the throughput in terms of megabytes per second (MBPS) would equal to input/output per second (IOPS) multiplied by the I/O Request Size (Throughput (MBPS)=IOPS*I/O Request Size). In other words, in order to maintain a constant throughput, IOPS should increase proportionally to the decrease in the I/O request size. But it is not as obvious as it seems to be for small I/O request sizes as considerable amount of metadata work is done for small I/O requests sizes, and thus using small I/O request sizes would yield a very low throughput. Also blindly merging the I/O requests does not help in achieving a high throughput as a large I/O request sizes would result in high latency.

Figure 4A:
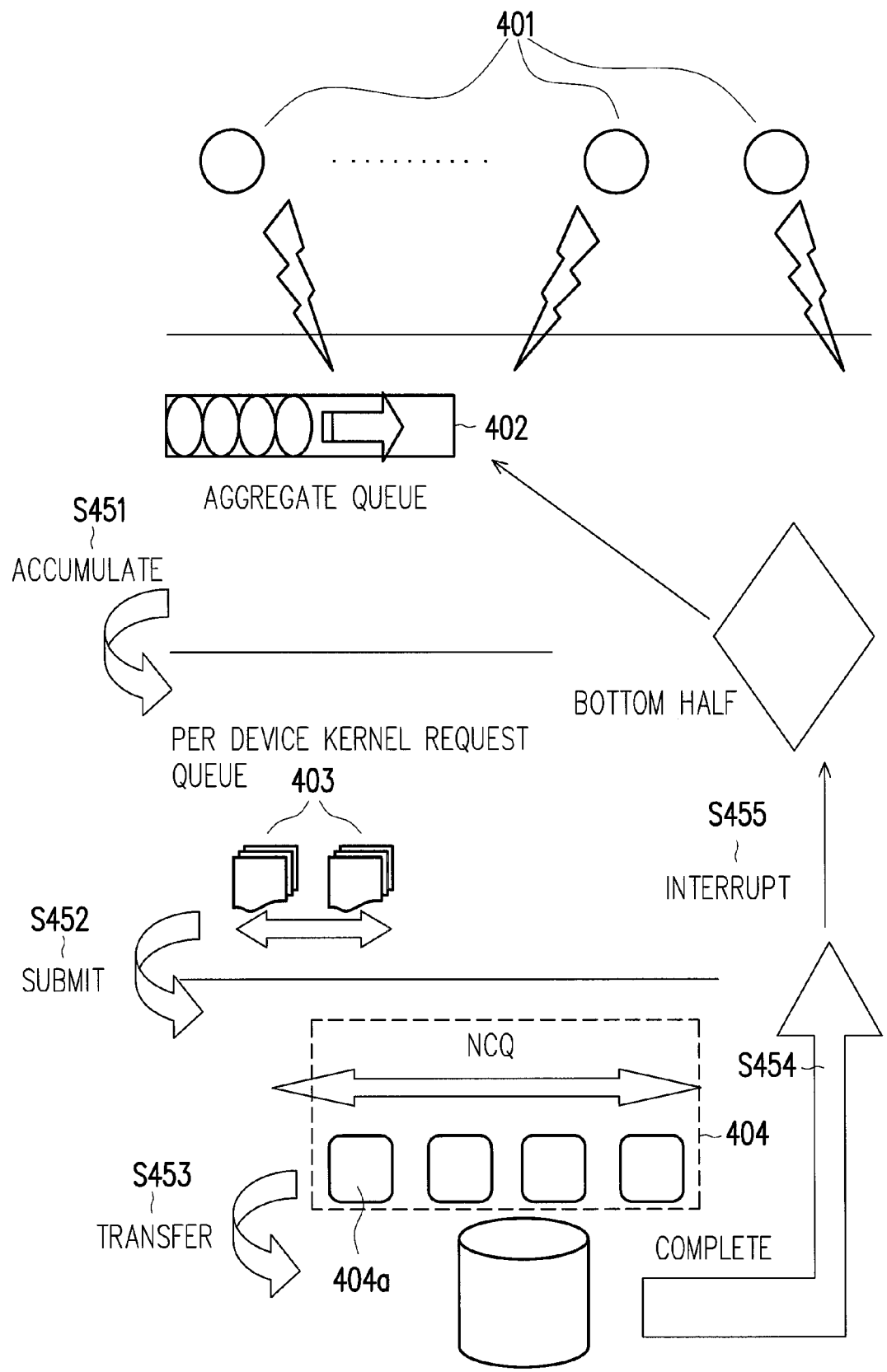
FIG. 4A illustrates a pipeline stage timing chart in accordance with one of the exemplary embodiments of the present disclosure.

FIG. 4A illustrates a four stage disk write pipeline in accordance with one of the exemplary embodiments of the present disclosure. FIG. 4B illustrates a pipeline stage timing chart in accordance with one of the exemplary embodiments of the present disclosure. As mentioned previously, the keys to maximize the logging operation rate would include properly batching incoming logging operation requests to balance between latency and data transport efficiency and constantly moving data to the disk platter. To embody these two ideas, a four-stage pipeline to process fixed-sized disk write requests would be proposed.

In the first stage (Accumulate, S451), incoming logging requests 401 from high-level logging operations would be inserted in the aggregate queue 402 of a host memory (e.g. FIG. 1 element 102) and be aggregated into low-level disk write requests to be stored in a per device kernel request queue 403. In the second stage (Submit, S452), aggregated disk write requests would be copied from the kernel request queue 403 of host memory (102) to the on-disk queue 404 managed by the NCQ. In the third stage (Transfer, S453), the payload of a queued disk write request (e.g. 404a) would be transferred to its associated location on the disk platter of a HDD (405). In the fourth stage (Complete, S454), the disk would deliver a completion interrupt (S455) to the host for every completed disk write request, which in turn may trigger additional processing on the host to complete each high-level logging operation associated with the completed disk write request. In this pipeline design, the on-disk controller would take care of the second half of the Submit (S452) stage, the Transfer stage (S453) and the first half of the Complete stage (S454), and the rest would be fully controlled by the host software. Because the on-disk controller is opaque to the host software, the cycle time of this pipeline would be mainly determined by the Transfer stage (S453). Since the time taken by the Transfer stage (S453) would depend on the size of the disk write request's payload, a design issue would involve determining the optimal disk write request size so that time taken in the four stages in this pipeline are balanced.

When the payload of the N-th disk write request would be fully transferred to the disk platter of the HDD 405, the on-disk controller of the HDD 405 may start the transfer of the N+1-th request's payload to the disk platter, and may send a completion interrupt to the host, which would arrange a DMA to move the payload of the N+2-th request's payload into the disk. If the N+2-th request's payload does not reach the disk in time, i.e., before the transfer of the N+1-request's payload is done, the on-disk controller won't be able to transfer the N+2-th request's payload immediately after completing the transfer of the N+1-th request's payload, thus wasting a full rotation delay. To avoid a full rotation delay, the critical path including the interrupt generation on the disk and the interrupt processing on the host and the payload DMA would be minimized. To minimize the interrupt generation time, NCQ's interrupt coalescing could be disabled. To minimize the impact of the interrupt processing time, the host software could schedule the payload DMA as soon as possible after receiving the hardware interrupt.

Although the raw data rate of modern PCIe bus (Gen2 or Gen3) is higher than that of the disk transfer bandwidth, the granularity of each disk write request would be sufficiently high to amortize the non-trivial fixed overhead that each PCIe bus transaction would incur. Because NCQ itself could also batch and schedule disk write requests in the on-disk queue, it could potentially increase the time taken by the Transfer stage (S453) by batching adjacent requests, or destroy the sequentially of requests serviced consecutively because of its rotation delay-aware scheduling. Suppose there are five 64-KB disk write requests in the on-disk queue, it is possible that NCQ's scheduling logic may choose to service the fifth request after servicing the first request because the fifth request is closer to the first request than the second request. However, since doing so would disrupt the pipeline, the present disclosure may preserve the command queuing mechanism of the NCQ and do away with the other mechanisms.

A low-level disk write request contained in the per device kernel request queue 403 could have a constant fixed batch size until the batch size is re-adjusted. The granularity or the batch size for each low-level disk write request moving through the pipeline would affect the performance of the logging system. If a batch size is too small, the time to submit a disk write request from the host memory to the on-disk queue would be longer than the time required to transfer the write request from on-disk queue to the disk platter because of the non-trivial per transaction overhead required in each write request. By the time the disk write request reaches the disk, the immediately previous disk write is already done, and the disk write request misses its target sector and is thus delayed by a full rotation cycle. When the batch size is too high, each disk write request would experience a higher queuing delay in the accumulation queue, and the transfer time would also be higher and consequently the average logging latency would be higher.

When the batch size is just right, the Submit stage (S452) time would be smaller than the Transfer stage (S453) time so that none of the disk write requests would experience a full rotation delay. In this way, the ideal batch size would be the smallest batch size that enables the Submit stage (S452) time to be smaller than the transfer stage time (S453). The effective pipeline time would be the Transfer stage (S453) time since it would likely be the slowest stage of the pipeline given the optimum batch size. Assuming that is the case and the Submit stage (s452) is nearly the same as the Transfer stage (S453) time, the average logging latency would be minimized. A batch size could be determined based on automated trial and error. In particular, a high level write request could be generated with a particular batch size, and then the latency of the write request could be measured. A different batch size could then be used based on the result of the measurement and thus the batch size could be fine-tuned by trying different batch sizes.

For the operation of the method, there could be two different operating modes. One would be 'dense-mode' logging, in which high-level logging operations arrive at the logging subsystem at a rate equal to its maximum throughput, and the other would be 'sparse-mode' logging, in which high-level logging operations arrive at the logging subsystem slower than its maximum throughput. A goal for dense-mode logging would be for both high logging throughput as well as low logging latency, whereas a goal for sparse-mode logging would mostly be low logging latency. For the dense mode, after receiving high-level logging operations, the high-level logging operations would be queued in the memory buffer of the host, and then the high-level operations would be batched into low-level aggregated disk write requests of an optimal size. Then when a completion interrupt arrives, another lower level disk write request would be submitted to an on-board queue of the logging disk to be managed by the NCQ. The merging and scheduling functionalities of the operation system would be disabled so that the buffering and batching would proceed according to the streamlined disk write pipeline design. To turn on the scheduling functionalities of NCQ, the NCQ queue length could be set to 2, so that the on-disk controller would not have more than one choice at a time. This streamlined disk write pipeline would be designed to move fixed-sized data payload in a lock-step fashion, similar to a CPU pipeline, so as to fully exploit the disk's raw data transfer capability and effectively convert its data transfer rate (Mbytes/sec) into the commensurate I/O rate (I/Os/sec).

According to the present disclosure, the target logical block address of an aggregated disk write request is determined only at the point when it is dispatched. Late address binding is provided when multiple physical disks are used in the disk logging system, where the relative timing for request completion among these disks could vary due to run-time conditions and thus is not fully deterministic. Accordingly, the target logical block address of each high-level logging operation would also determined mostly only when its associated aggregated disk write request is dispatched. After a disk write request is completed, the completion signal would be demultiplexed to the logging operations that compose the disk write request by invoking their corresponding post-completion request completion logic. The latency of a logging operation would the time interval between when the logging operation enters the system memory buffer and when the post completion processing of the logging operation is finished.

To jump-start the proposed streamlined disk write pipeline, back to back two disk write requests would be issued to the disk to fill up the Transfer and Submit stage, and then holds off the third disk write request until the completion interrupt of the first disk write request arrives. After that, a new aggregated disk write request would be fed to the pipeline after an existing disk write request exits the pipeline.

Figure 5:
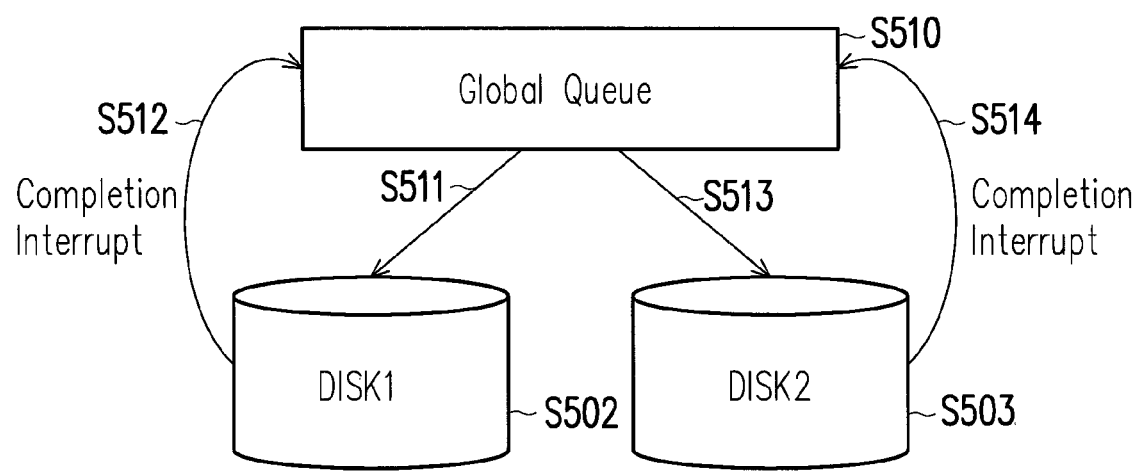
FIG. 5 illustrates disk logging in multiple disks in accordance with one of the exemplary embodiments of the present disclosure.

For the case of multiple logging disks, it could be accomplished by allocating a separate per-device request queue for each individual disk. FIG. 5 illustrates disk logging in multiple disks in accordance with one of the exemplary embodiments of the present disclosure. For multiple disks such as disk1 502, disk2 503, or more, the Accumulate stage (S451) is centralized and the aggregate queue 501 would be shared among multiple logging disks such as disk1 502 and disk2 503. This means that when incoming high-level logging operations are aggregated into low-level disk write requests for all logging disks in the aggregate queue 501, and as soon as a completion interrupt (S512 or S514) from a logging disk (502 or 503) would come, an aggregated disk write request (S511 or SS13) to a particular logging disk would be submitted in order to avoid contention among logging disks. The logging disks could be jump-started in a staggered fashion to prevent unwanted synchronization among them. The optimal batch size for a disk write pipeline on a server could depend on its PCIe bus and disk interface (SATA, SAS or SCSI) which affect the Submit stage (S452) time, and the RPM rating of the disk, which affects the Transfer stage (S453) time. Because the Transfer stage (S453) time for a disk write request of a certain size may vary depending on where its target address lies on the disk surface, the optimal batch size of a disk write pipeline could change as the pipeline traverses different parts of the disk surface. For example, the first batch size is dynamically adjusted such that the first batch size in the outer track of the storage medium is larger than the first batch size in the inner track of the storage medium. Moreover, because outermost tracks (closer to track 0) have higher sector density than innermost tracks, the data transfer rate of the former would be higher than the latter's. Therefore, the optimal batch size would be expected to change as the target addresses traverses in different parts of the disk surface.

Essentially, for the dense mode, the NCQ would be maintain at 2 so that one request would always be ready in the native disk controller queue (NCQ) to be served, as soon as the disk head would finish writing a request to the disk platter. Also through a few trial and errors, the optimal batch size could be obtained such that the time taken in the pipeline for all 4 stages (S451~S454) would be balanced.

An implicit assumption underlying the streamlined disk write pipeline is that there would be an infinite stream of disk write requests that are waiting to fill the pipeline. This assumption could be valid for dense mode logging but does not hold for sparse-mode logging. More concretely, if a logging operation request appears after a period of inactivity, this logging operation request may enter the disk write pipeline alone and therefore cannot benefit from any disk head position information that may be gleaned from neighboring requests, as is the case in dense-mode logging. As a consequence, the average latency of such logging operation requests would be high, since it could be difficult to ensure that the target address assigned to a sparse-mode logging operation request is close to the disk head position at the time when the request is submitted. Constantly predicting the disk head position and using the prediction to derive a target logical block address for each sparse-mode logging operation could be unfeasible as modern disks become more and more complicated, this approach becomes less and less effective, because the internal control mechanisms inside disk drives, such as NCQ, on-disk caching, interrupt coalescing, etc., tend to obscure disk head movement and thus get in the way of disk head position prediction.

Therefore, the method of the present disclosure leverages its dense-mode logging architecture to implement sparse-mode logging. More concretely, when the application level no longer generates logging requests, dummy aggregated disk write requests would constantly be filled in the aggregated buffer, and the subsequently the dummy aggregated disk write requests would be written along with real logging requests in order to write to the logging disk constantly. Also, whenever an application-level logging operation request has been received, the logging request could be aggregated with dummy disk write requests in the aggregated disk queue. When the next disk completion interrupt comes, this disk write request would be dispatched as usual. In other words, disk write pipeline would constantly be busy either with real disk write requests accumulated from application-level logging operation requests or with dummy disk write requests, but some of the dummy disk write requests may contain high-level logging operations issued by applications.

Having the disk write pipeline driven by events such as request completion interrupts rather than by a hardware clock could make the logging system self-adaptive to the timing variations of the disk write pipeline as the timing experienced by each disk write request may vary. However, by keeping the disk write pipeline full with dummy write requests, all the timing variations due to firmware, software or hardware would automatically accounted for and thus removed from the implementation complexity of sparse-mode disk logging.

The additional power consumption associated with dummy disk write requests would be addressed in the following disclosure.

Figure 6:
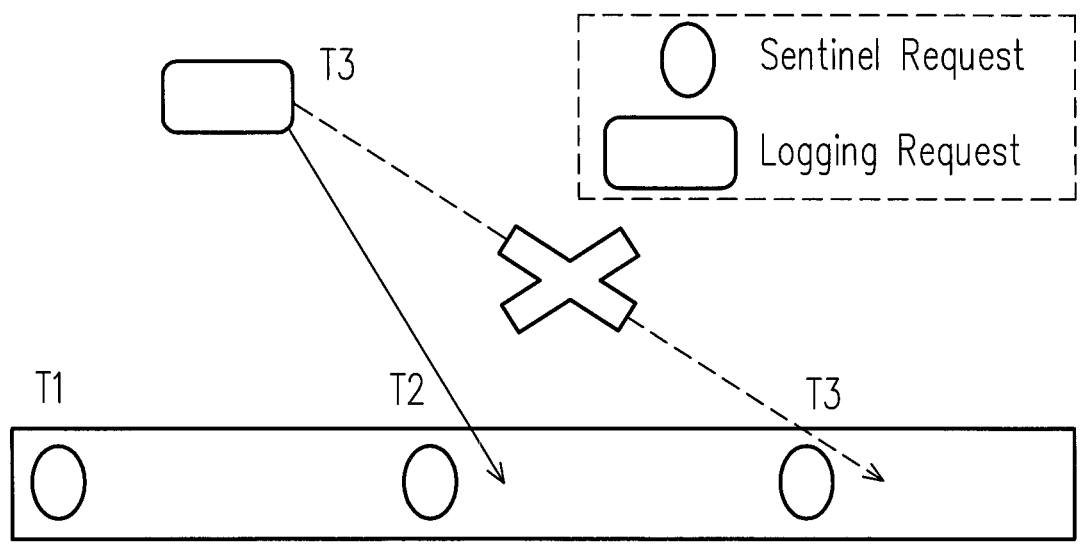
FIG. 6. illustrates using sentinel write requests in accordance with one of the exemplary embodiments of the present disclosure.

Assuming that the logging system continuously dispatches disk write request of size S whose target addresses are S apart, where S corresponds to the batch size. There could be two possible approaches to reduce the power consumption due to the unnecessary dummy writes. One approach as illustrated in FIG. 6. would be to submit the same sequence of disk write requests in the same way as in the dense mode but instead submit a sentinel write request which means to decrease the size of each submitted disk write request to just one disk sector (512 bytes) when there are no pending logging operation requests. This way, the number of bytes written to disk could be reduced by one to two orders of magnitude when there are no pending logging operation requests. In other words, if a batch size containing real data is 32 kB, a disk write operation would write the entire 32 kB on the disk. But if the disk write operation is for a dummy write containing no real data, the disk write operation would write only 512 bytes. In FIGS. 6, T1, T2, and T3 would be dummy writes of 512 bytes in size if there is no logging request. A logging request could be aggregated with real or dummy data and submitted to be written to disk but targeted to piggyback an earlier issued sentinel request. In other words, a write request destined for T3 could be written in T2 instead of T3.

Figure 7:
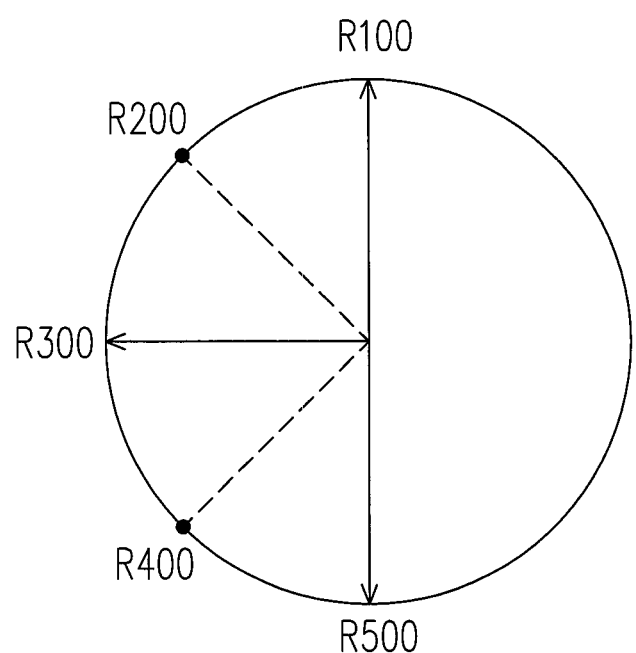
FIG. 7 illustrates submitting disk write requests in less slots in accordance with one of the exemplary embodiments of the present disclosure.

A second approach to conserve energy would be to issue only 1 out of every N disk write requests as in the dense mode. FIG. 7 illustrates submitting disk write requests in less slots in accordance with one of the exemplary embodiments of the present disclosure. A dense mode setup would have specific time slots for when merged records have to be submitted to disk. By submitting one request out of every N slot, this would save energy for not writing N−1 slots. In this way, the number of bytes written to disk would be reduced by a factor of N when there are no pending logging operation requests. For example, referring to FIG. 7 which illustrates only 1 out of every two slots are submitted, by not writing in R200 and R400, energy consumption could be reduced to half.

Unfortunately it would not be straightforward to implement these ideas because the on disk scheduler merges and re-orders requests which are not well coordinated. To get around the request merging mechanism, the target address of each submitted disk write request could be set at, for example, 1 millisecond (ms) away from the disk head position at the time when it arrives on the disk. This would prevent each submitted disk write request from experiencing a full rotation delay. To get around the on-disk request scheduler, the effective number of active requests in the NCQ queue could be limited to 4, and this would ensure that the effective number of active requests would be sufficiently far apart. Taking into account these constraints, a low-power version of sparse mode disk logging could be implemented as follows.

Assuming that a sequence of sentinel disk write requests would be dispatched to the logging disk regardless of whether applications issue any logging operation requests. When the N-th sentinel request is completed, the low-power operation would issue the N+2-th sentinel request. The distance between the target addresses of consecutive sentinel requests would be D sectors, where the time it takes for the disk head to pass D sectors would be at least 1 msec. Suppose the target address of a sentinel request is Sector T, then all application-issued logging operation requests that arrive between the time when the disk head passes Sector T-M-D and the time when the disk head passes Sector T-M would be aggregated into one disk write request that is to be merged with this sentinel request. The interval marked by these two time points would be the feasible interval associated with this sentinel request. M would stand for an empirical safety margin in the following sense—If a new request is to be merged with an existing sentinel request without disrupting the service order, the new request would arrive at the disk at least M sectors before the disk head passes the existing request's target address. The size of each sentinel request would be 4 KB because this is the minimum size for a request which could be merged. This low-power operation not only dispatches fewer disk write requests than the regular operation with straight forward dummy writes or full operation but also keeps each request smaller than those in full operation or dense mode.

Figure 8:
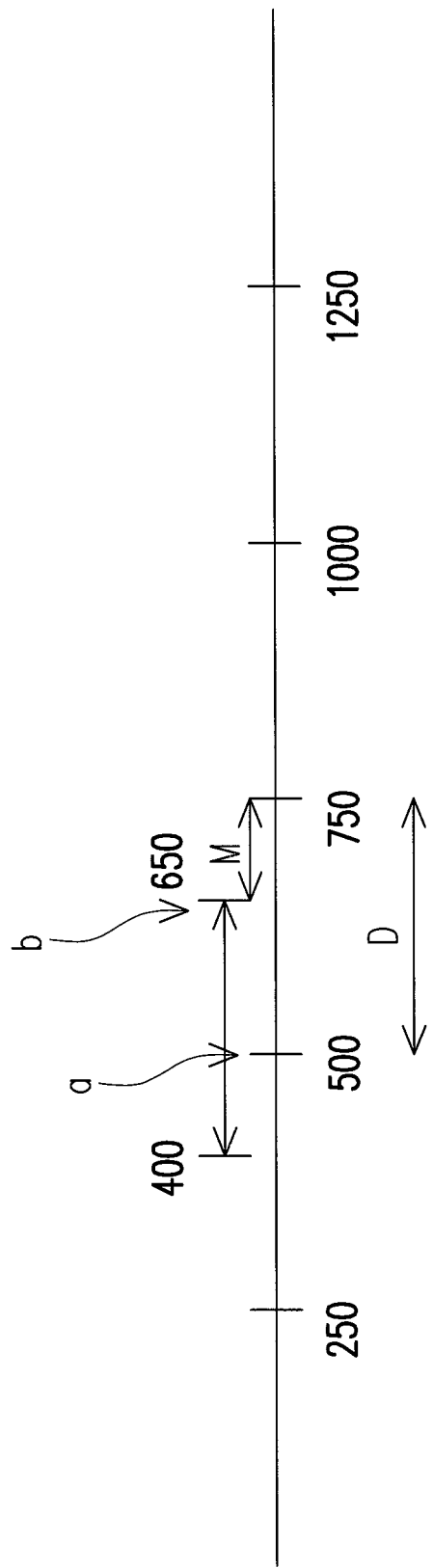
FIG. 8 illustrates an example sentinel disk write request for low power operation in accordance with one of the exemplary embodiments of the present disclosure.

FIG. 8 illustrates an example sentinel disk write request for low power operation in accordance with one of the exemplary embodiments of the present disclosure. FIG. 8 shows an example schedule of sentinel requests in low-power Beluga, where D is 250 and M is 100. The target addresses of the sentinel requests would assume to be sector 250, 500, 750, 1000, 1250, 1500, etc. The sentinel request with the target address Sector 750 would be dispatched when the request with the target address Sector 250 is completed, or about 500 sectors before it is serviced. It could take more than 1 msec for the disk head to fly over 500 sectors. In addition, at most two sentinel requests could be in the on-disk queue at a time. For this sentinel request (spanning Sector 750 to 757), all application-issued logging operation requests that arrive between the time when the disk head passes Sector 400 and the time when the disk head passes Sector 650 are aggregated into one disk write request whose target address is Sector 758 and submitted to the disk when the disk head passes Sector 650. If there would be no application-issued logging operation requests, the number of bytes written in low power operate could be 8 sectors every 250 sectors, or roughly $\frac{1}{30}$ of that of full operation.

Figure 9:
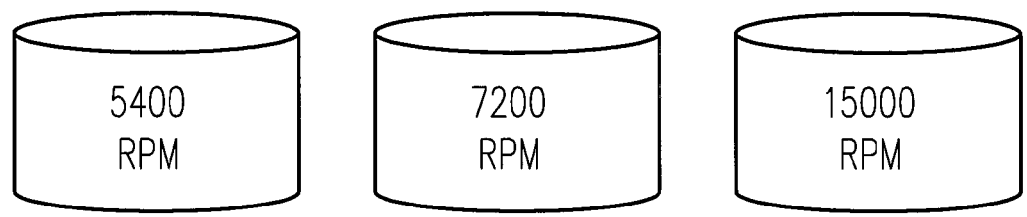
FIG. 9 illustrates using a hierarchy of different RPM disks to enable sparse mode logging in accordance with one of the exemplary embodiments of the present disclosure.

FIG. 9 illustrates using a hierarchy of different RPM disks to enable sparse mode logging in accordance with one of the exemplary embodiments of the present disclosure. Another viable alternative for the low power operation in sparse mode logging would be to use a hierarchy of different RPM disks. Since the energy consumption in a hard disk is directly proportional to how fast a disk rotates, employing lower RPM disks saves energy at the cost of lesser throughput. For fasting logging in dense mode, the 15000 RPM disk in FIG. 9 could be used. However in sparse mode logging, throughput is no longer an important criteria, guaranteeing lower latency would remain a higher priority. Therefore, energy could be saved by using lesser RPM disks such as the 5400 RPM disks. The performance with optimal energy consumption could be further optimized by completely switching off disks that are rarely used so that energy due to rotation could also be saved.

Figure 10:
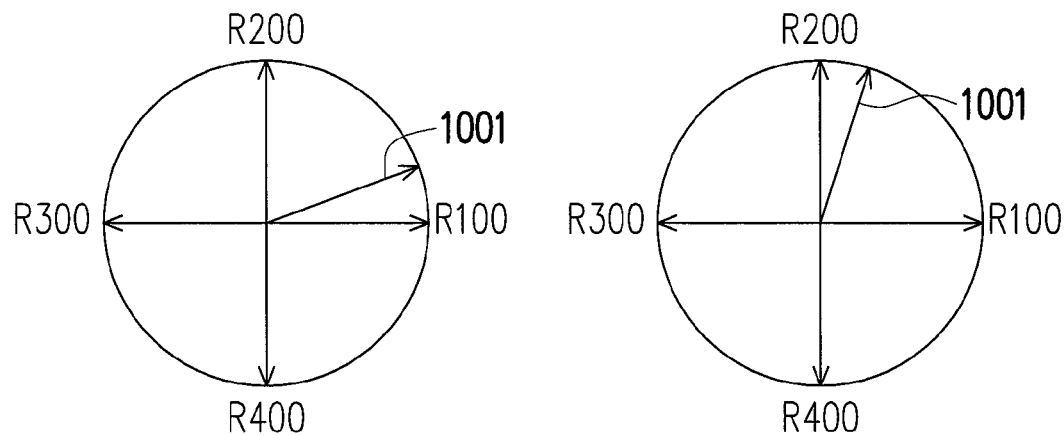
FIG. 10 illustrates sparse mode logging with less data submitted in each merge record in accordance with one of the exemplary embodiment of the present disclosure.

FIG. 10 illustrates sparse mode logging with less data submitted in each merge record in accordance with one of the exemplary embodiment of the present disclosure. Energy could be saved due to unwanted dense mode writing by intelligently submitting lesser data in each merged record to the underlying disk in every write operation. By writing the first sector for every N sectors in a merged record or by writing the last sector for every N sectors in a merged record when the logging disk system is configured for sparse mode logging, logging requests would be expected to arrive at a rate slower than the maximum throughput of the underlying disk(s). In other words, data could either be written for first few sectors 1001 or for last few sectors 1002 in a merged record. Either approach helps writing lesser data while maintaining the disk write pipeline intact. The amount of data to be written could be chosen dynamically, proportional to the logging request ingest rate to save energy spent on writing data to disk.

Figures 11A, 11B:
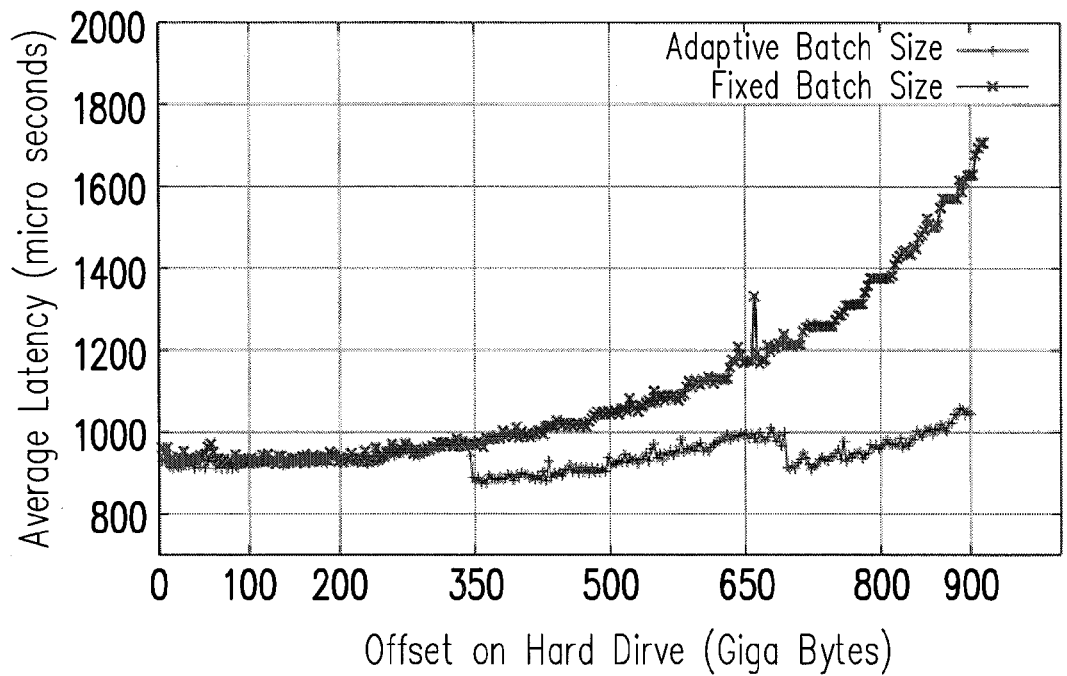

FIG. 11A~11D illustrates the performance measurement of the method of the present disclosure. FIG. 11A shows the average logging latency when data is written at different offsets on the disk while the logging operation request size is 256 bytes. FIG. 11B shows that the latency and throughput of 256 bytes logging operation when their log records are written to different parts of the disk using different batch size. Since the optimal batch size for different parts of a disk is could be different, an adaptive batch size selection mechanism would choose the optimal batch size according to the current disk head position. The adaptive batch size selection mechanism is able to keep the average logging latency below 1 ms throughout the entire disk, whereas using a fixed batch size (e.g. 32 kB) could lead to an increase in the average logging latency by more than 70% when the disk head reach the center of the disk platters. FIG. 11C shows that the average logging latency remains steady and the throughput drastically increases when the number of disks increases from 1 to 3 while the logging operation request size is 256 bytes. FIG. 11D shows a throughput of 1.2 million IOPS for 256 bytes logging operations while end to end latency is under 1 ms for each logging operation. These numbers are the best numbers reported at this point in time. The significance of the 1.2 million TOPS is that on a 7200 RPM disk, 100 MBPS would be the raw sequential bandwidth. However, converting 100 MBPS, which is 100,000 KBPS into 400,000 256 byte operations per second is not a trivial task. By using 3 logging disks in the presented disclosure, the IOPS would scale linearly and delivers 3*400 K 256 byte requests/second=1.2 million 256 byte records/second.

Figure 12:
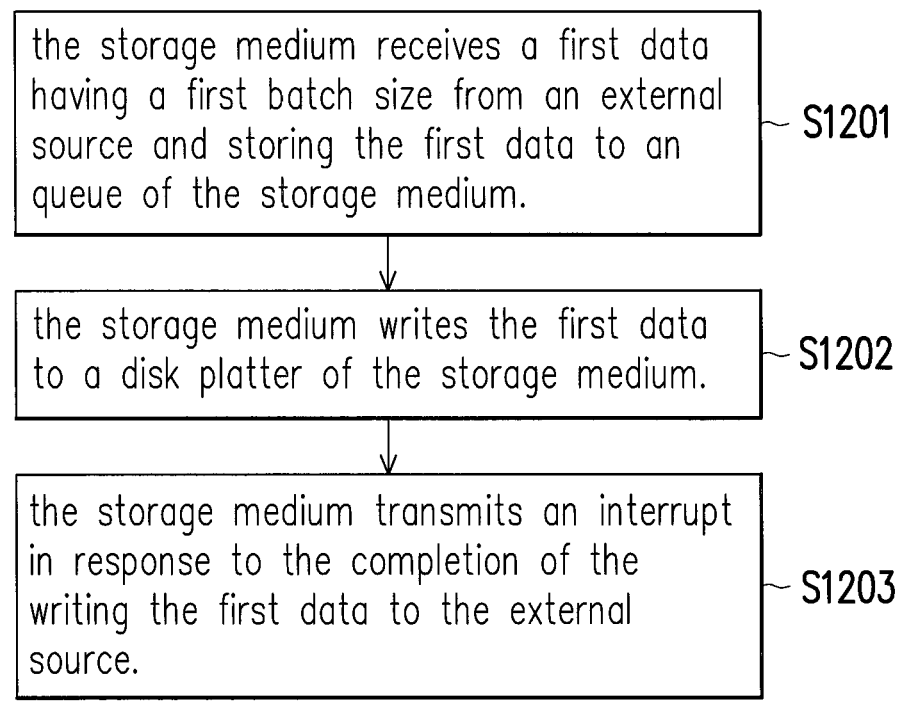
FIG. 12 illustrates the method of disk logging from the perspective of a logging disk in accordance with one of the exemplary embodiments of the present disclosure.

FIG. 12 illustrates the method of disk logging from the perspective of a logging disk in accordance with one of the exemplary embodiments of the present disclosure. It would be assumed that the exemplary method would be configured for a temporary non-volatile storage medium such as a HDD in order to log data from a volatile memory such as Cache or RAM to said storage medium. The method is as follows. In step S1201, the storage medium receives a first data having a first batch size from an external source and storing the first data to an queue of the storage medium. In step S1202, the storage medium writes the first data to a disk platter of the storage medium. In step S1203, the storage medium transmits an interrupt in response to the completion of the writing the first data to the external source. It should be noted that the first batch size is dynamically adjusted such that the step of writing the first data takes more time than the step of receiving and storing the first data.

Figure 13:
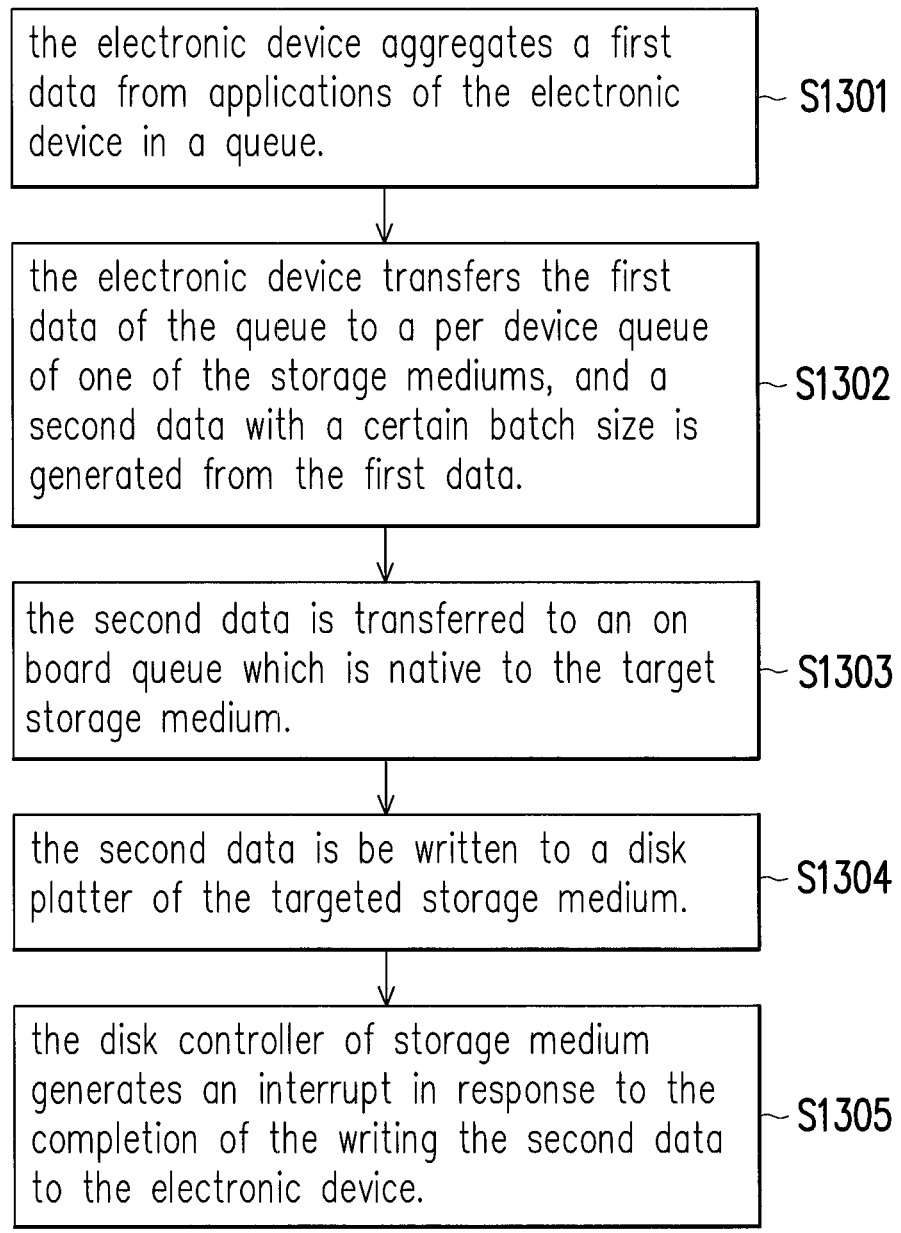
FIG. 13 illustrates the method of disk logging from the perspective of an electronic device in accordance with one of the exemplary embodiments of the present disclosure.

FIG. 13 illustrates the method of disk logging from the perspective of an electronic device in accordance with one of the exemplary embodiments of the present disclosure. It would be assumed that the electronic device has at least but not limited to a processor and controller complex configured to execute the method of the present disclosure, one or more temporary non-volatile storage mediums such as HDDs to log data from a volatile memory such as RAM or cache to said storage medium, and the method is proposed as follows. In step S1301, the electronic device aggregates a first data from applications of the electronic device in a (global) queue. In step S1302, the electronic device transfers the first data of the (global) queue to a per device queue of one of the storage mediums, wherein the per device queue is specifically for the targeted storage medium, and a second data with a certain batch size is generated from the first data. In step S1303, the second data would be transferred to an on board queue which is native to the target storage medium. In step S1304, the second data would be written to a disk platter of the targeted storage medium. In S1305, the disk controller of storage medium would generate an interrupt in response to the completion of the writing the second data to the electronic device, wherein the first batch size is dynamically adjusted such that the step of writing the second data takes more time than the step of transferring the second data to the third queue.

Figure 14:
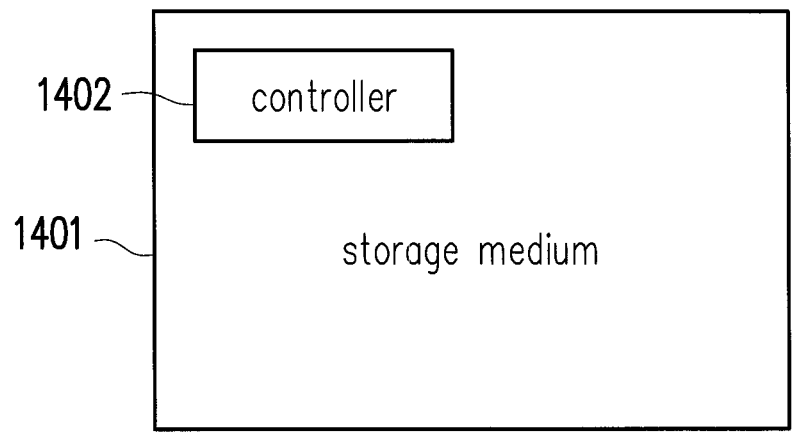
FIG. 14 illustrates a storage medium using the method in accordance with one of the exemplary embodiments of the present disclosure.

FIG. 14 illustrates a storage medium 1401 having a controller 1402, and the controller 1402 is configured for receiving a first data having a first batch size from an external source and storing the first data to an queue of the storage medium, writing the first data to a disk platter of the storage medium, and transmitting an interrupt in response to the completion of the writing the first data to the external source, wherein the first batch size is dynamically adjusted such that the step of writing the first data takes more time than or substantially the same time as the step of receiving and storing the first data.

Figure 15:
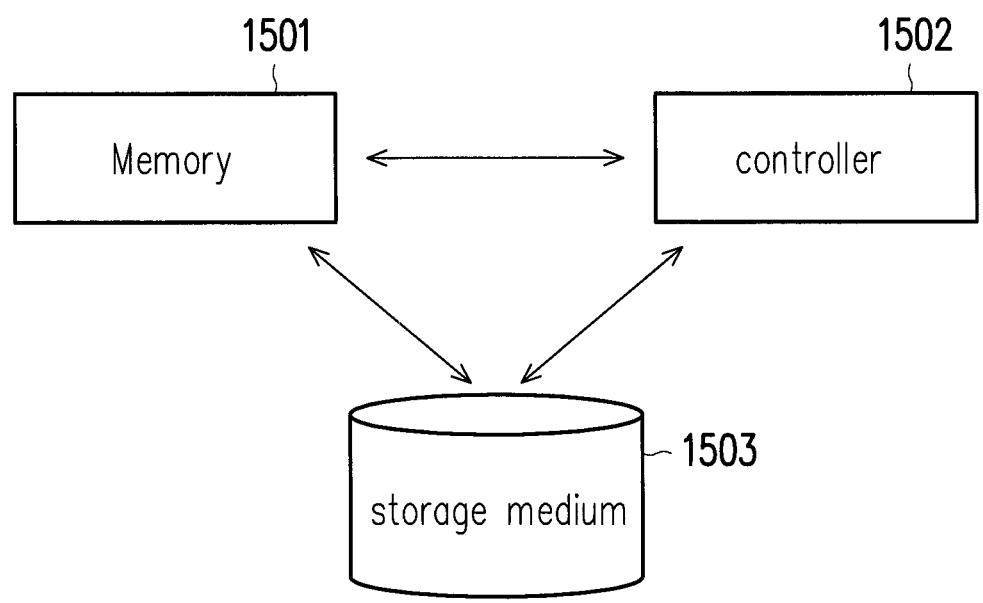
FIG. 15 illustrates an electronic device using the method in accordance with one of the exemplary embodiments of the present disclosure.

FIG. 15 illustrates an electronic device 1500 (i.e. a disk logging subsystem) comprising a first temporary non-volatile storage medium 1503 to log data from a volatile memory 1501 to said first storage medium 1503, and the electronic device also comprises a controller 1502 configured for aggregating a first data from applications of the electronic device in a first queue; transferring the first data of the first queue to a second queue of the first storage medium 1503, wherein the second queue is exclusively for the first storage medium 1503 and a second data with a first batch size is generated from the first data; transferring the second data to a third queue which is native to the first storage medium 1503; writing the second data to a disk platter of the first storage medium 1503; and transmitting an interrupt in response to the completion of the writing the second data to the first queue, wherein the first batch size is dynamically adjusted such that the step of writing the second data takes more time than the step of transferring the second data to the third queue.

Also it should be noted that from the hardware perspective, the storage medium could be a typical hard disk drive (HDD) which is configured to execute the method of the present disclosure. The HDD would store digital data on a rotating platter coated with magnetic material and would use a magnetic head disposed on a moving actuator arm to read and write data on the rotating platter. The hard disk drive would also contain elements including at least but not limited to an onboard controller/processor, buffer memory, and I/O ports.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A disk logging method configured for a temporary non-volatile storage medium to log data from a volatile memory to said storage medium, and the method comprising:
receiving a first data having a first batch size from an external source and storing the first data to an queue of the storage medium;
writing the first data to a disk platter of the storage medium; and
transmitting an interrupt in response to completion of the writing the first data to the external source, wherein the first batch size is dynamically adjusted such that the step of writing the first data takes more time than or substantially the same time as the step of receiving and storing the first data.

2. The method of claim 1, wherein said storage medium is a hard disk drive (HDD) which stores digital data on a rotating platter coated with magnetic material and uses a magnetic head disposed on a moving actuator arm to read and write data on the rotating platter.

3. The method of claim 2, wherein the storage medium writes data to the disk platter constantly from a first sector of a first track of the storage medium to a last sector of a last track of the storage medium without ceasing.

4. The method of claim 3 further comprising:
transferring the first data to a permanent storage before the storage medium writes to the last sector of the last track.

5. The method of claim 3 further comprising the storage medium writes data to the disk platter constantly from the first sector of the first track of the storage medium to the last sector of the last track of the storage medium without empty sectors in between.

6. The method of claim 3 further comprising the storage medium writes data to the disk platter constantly from the first sector of the first track of the storage medium to the last sector of the last track of the storage medium without knowing exact geometry details of the storage medium.

7. The method of claim 1, wherein only in response to the transmitting the interrupt, the storage medium receives the first data having the first batch size from the external source and stores the first data into the queue of the storage medium.

8. The method of claim 1, wherein the first batch size is dynamically adjusted further comprises the first batch size is dynamically adjusted such that the step of writing the first data takes substantially the same time as the step of receiving and storing the first data.

9. The method of claim 1, wherein the first batch size is dynamically adjusted such that the first batch size in an outer track of the storage medium is larger than the first batch size in an inner track of the storage medium.

10. The method of claim 9, wherein the storage medium maintains a constant throughput which is determined based on a total number of input and output per second multiplied by the dynamically adjusted first batch size.

11. The method of claim 1 wherein the steps of claim 1 are not managed by any file system of an operation system.

12. The method of claim 1, wherein the queue of the temporary non-volatile storage medium is managed by Native Command Queuing (NCQ).

13. The method of claim 12, wherein the NCQ is set to 2 when the storage medium receiving from the external source a constant stream of application driven data.

14. The method of claim 1, wherein the first data comprises a dummy data which is not application driven.

15. The method of claim 14, wherein the writing the first data to the disk platter is only one sector.

16. The method of claim 14, the first data further comprises application driven data together with the dummy data.

17. The method of claim 14, wherein the queue of the temporary non-volatile storage medium is managed by Native Command Queuing (NCQ) is set to a value equal or greater than 2.

18. The method of claim 14, the storage medium carries out 1 write request out of every N write slots, where N is an integer greater than 1.

19. The method of claim 14, wherein the storage medium writes a first sector for every n sectors in a merged record or write a last sector for every n sectors in a merged record where n is an integer greater than 1.

20. The method of claim 1, wherein the storage medium belongs to a disk array managed by a global queue which aggregates data for the external source.

21. A non-transitory storage medium comprising a controller, wherein the controller is configured for
receiving a first data having a first batch size from an external source and storing the first data to an queue of the storage medium;
writing the first data to a disk platter of the storage medium; and
transmitting an interrupt in response to completion of the writing the first data to the external source, wherein the first batch size is dynamically adjusted such that the step of writing the first data takes more time than or substantially the same time as the step of receiving and storing the first data.

22. The storage medium of claim 21, wherein the storage medium is a hard disk drive (HDD) which stores digital data on a rotating platter coated with magnetic material and uses a magnetic head disposed on a moving actuator arm to read and write data on the rotating platter.

23. A disk logging method configured for an electronic device comprising a first temporary non-volatile storage medium to log data from a volatile memory to said first storage medium, and the method comprising:
aggregating a first data from applications of the electronic device in a first queue;
transferring the first data of the first queue to a second queue of the first storage medium, wherein the second queue is exclusively for the first storage medium and a second data with a first batch size is generated from the first data;
transferring the second data to a third queue which is native to the first storage medium;
writing the second data to a disk platter of the first storage medium; and
transmitting an interrupt in response to completion of the writing the second data to the first queue, wherein the first batch size is dynamically adjusted such that the step of writing the second data takes more time than the step of transferring the second data to the third queue.

24. The method of claim 23, wherein the first storage medium is a hard disk drive (HDD) which stores digital data on a rotating platter coated with magnetic material and uses a magnetic head disposed on a moving actuator arm to read and write data on the rotating platter.

25. The method of claim 24, wherein the first storage medium writes data to the disk platter constantly from a first sector of a first track of the storage medium to a last sector of a last track of the storage medium without ceasing.

26. The method of claim 25 further comprising:
transferring the second data to a permanent storage before the storage medium writes to the last sector of the last track.

27. The method of claim 25 further comprising the first storage medium writes data to the disk platter constantly from the first sector of the first track of the storage medium to the last sector of the last track of the first storage medium without empty sectors in between.

28. The method of claim 25 further comprising the first storage medium writes data to the disk platter constantly from the first sector of the first track of the first storage medium to the last sector of the last track of the first storage medium without knowing exact geometry details of the first storage medium.

29. The method of claim 23, wherein only in response to the transmitting the interrupt, the first storage medium receives the second data and stores the second data in the third queue of the first storage medium.

30. The method of claim 29, wherein the steps of claim 23 are not managed by any file system of an operation system of the electronic device.

31. The method of claim 23, wherein the first batch size is dynamically adjusted further comprises the first batch size is dynamically adjusted such that the step of writing the second data takes substantially the same time as the step of transferring the second data to the third queue.

32. The method of claim 23, wherein the first batch size is dynamically adjusted such that the first batch size in an outer track of the first storage medium is larger than the first batch size in an inner track of the first storage medium.

33. The method of claim 32, wherein the first storage medium maintains a constant throughput which is determined based on a total number of input and output per second multiplied by the dynamically adjusted first batch size.

34. The method of claim 23, wherein the third queue of the first storage medium is managed by Native Command Queuing (NCQ).

35. The method of claim 34, wherein the NCQ is set to 2 when the first storage medium receiving from the external source a constant stream of application driven data.

36. The method of claim 23, wherein the first queue comprises a dummy data which is not application driven.

37. The method of claim 36, wherein the writing the second data to the disk platter is only one sector.

38. The method of claim 36, the second data further comprises application driven data together with the dummy data.

39. The method of claim 36, wherein the queue of the temporary non-volatile storage medium is managed by Native Command Queuing (NCQ) is set to a value equal or greater than 2.

40. The method of claim 36, the first storage medium carries out 1 write request out of every N write slots, where N is an integer greater than 1.

41. The method of claim 36, wherein the first storage medium writes the first sector for every n sectors in a merged record or write the last sector for every n sectors in a merged record where n is an integer greater than 1.

42. The method of claim 36, wherein the electronic device further comprises a second storage medium which spins are a different speed from the first storage medium, wherein the first storage medium and the second storage medium are electrically coupled to the first queue.

43. The method of claim 42, wherein the electronic device selects the first storage medium or the second storage medium based on quantity of application driven data.

44. An electronic device comprising a first temporary non-volatile storage medium to log data from a volatile memory to said first storage medium, and the device comprises a controller configured for:
aggregating a first data from applications of the electronic device in a first queue;
transferring the first data of the first queue to a second queue of the first storage medium, wherein the second queue is exclusively for the first storage medium and a second data with a first batch size is generated from the first data;
transferring the second data to a third queue which is native to the first storage medium;
writing the second data to a disk platter of the first storage medium; and
transmitting an interrupt in response to completion of the writing the second data to the first queue, wherein the first batch size is dynamically adjusted such that the step of writing the second data takes more time than the step of transferring the second data to the third queue.

* * * * *